July 5, 1927.
G. B. KISSINGER
AUTOMOBILE LOCK
Filed Feb. 9, 1922
1,634,583
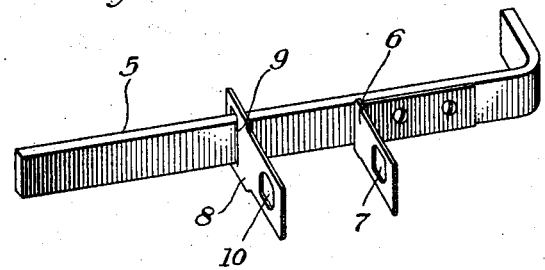
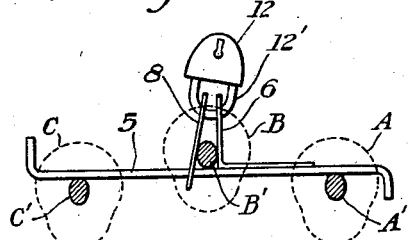
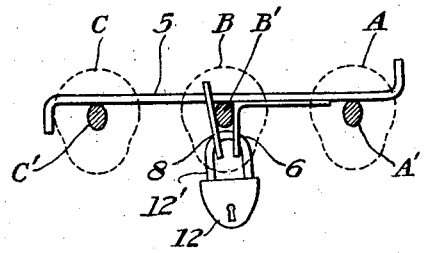
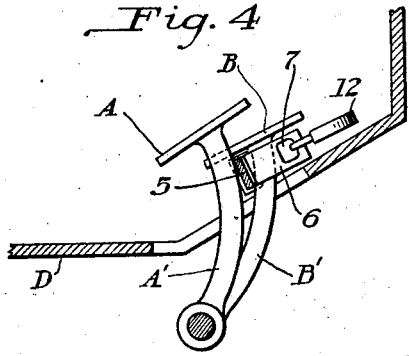
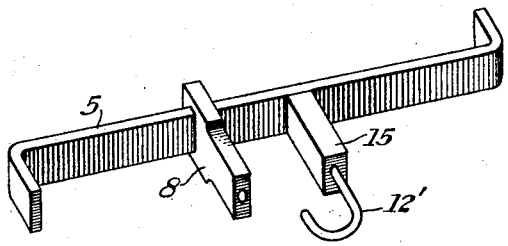
INVENTOR.
George Buffington Kissinger
by C. M. Clarke
Atty.

Patented July 5, 1927.

1,634,583

UNITED STATES PATENT OFFICE.

GEORGE BUFFINGTON KISSINGER, OF ASPINWALL, PENNSYLVANIA, ASSIGNOR OF ONE-HALF TO WILLIAM B. SALT, OF ASPINWALL, PENNSYLVANIA.

AUTOMOBILE LOCK.

Application filed February 9, 1922. Serial No. 535,300.

This invention relates to a safety lock for automobiles, and particularly to a locking device for the shifting levers or pedals thereof.

The invention has for its objects to provide a simple form of locking device which may be cheaply made and which can be readily applied to the foot pedal controls of the automobile by the user when it is desired to lock the car and which may be easily moved when it is desired to drive the automobile. The device is designed to lock the pedals in either one of two positions. In one position, the car is positively locked against movement, while in the other position the car may be moved to a limited extent so as to comply with those laws enforced in certain zones, which prevent a car from being immovably locked, in order that in case of an emergency, such as fire, they may be moved.

My invention may be readily understood by reference to the accompanying drawings which illustrate my invention.

In the drawings:

Fig. 1 is a perspective view of the locking device;

Fig. 2 is a plan view showing the lock applied to the pedals to lock the car positively against movement, the pedals being indicated in dotted lines, while the shanks thereof are in section;

Fig. 3 is a similar view of the device in its second locking position;

Fig. 4 is a side elevation of the pedals showing the locking device applied thereto; and Fig. 5 is a perspective view of a slight modification.

The locking device comprises a body member 5 formed of a rectangular metal bar of suitable strength and dimensions to resist considerable bending strain, sufficiently thin for insertion lengthwise between the pedal shanks, and of substantial width for resisting opposition edgewise underneath one or more of the pedals. Projecting from one face of the body intermediate its ends is a transverse extension 6 which is preferably in the form of a metal strip bent into a right angle which is riveted to the body. A hole 7 passes through the outer portion of this transverse extension. A transversely extending plate or bar 8 is also carried on the body 5. This plate has a rectangular opening 9 therethrough corresponding to the cross sectional shape of the body 5, so that the plate may slide along the body. An aperture 10 is also provided at the outer end portion of this plate. It is desired, although not necessary, that one or both of the extreme ends of the body 5 be bent at right angles to the main portion of the body for the purpose hereinafter described.

The automobile control pedals are designated as A, B and C. D designates the floor. There are three such pedals in a well known automobile. A designates the foot brake, B is the reversing gear pedal, and C is the clutch and gear changing pedal. A', B' and C' are the shanks of the respective pedals.

The foot brake A is operated by pushing it inwardly and forwardly, moving the shank in the corresponding direction. To reverse the car, pedal B is pushed in the same manner. Pedal C has three operating positions. When it is fully projected, it is in high gear; when it is fully depressed, it is in low gear; and when it is at the intermediate position, it is neutral.

To positively lock the car, the body or bar 5 is passed to the rear (relatively to the driver's seat) of shanks A' and C', while pedal B is depressed, so that it extends in front of the shank B', as shown in Fig. 2. The bar is inserted until the transverse projection 6 engages the shank of the central pedal B. Plate 8 is then slid along the bar until the shank of the central or reverse pedal B is engaged between it and the transverse projection 6. The shackle 12' of a padlock 12 is then passed through openings 7 and 10. The locking device is thus fixed to the pedal B, which is in reverse position. Pedal C, however, is in high gear position, and so the gears are interlocked and counteract to prevent the motor being started or the car moved, even though it were parked on a hill-side.

In the normal position of the pedals, they are out of alinement and the brake pedal A does not extend as near to the operator as either of the other pedals. When locking the car, as shown in Fig. 3, the emergency brake is set, which, as is well understood, moves pedal C into neutral or partly depressed position, which is the position indicated in Fig. 3. To apply the lock, the reverse pedal is also depressed and the body 5 is applied as shown. The brake pedal A remains in normal position. When locked as shown, the car may be pushed about rearwardly by releasing the emergency brake and allowing the pedal C to remain in neutral. If the pedal C were allowed to move into high gear, it might, in the event there was sufficient play in pedal B, allow the car to be moved forward, but the engine could not be started with the gears in high speed.

The bent ends on the bar 5 insure against the body being lifted vertically at one end out of disengagement with the pedal to which it is adjacent.

The locking device will, therefore, either immovably lock all parts of the car in the first position by engaging the gears in counter-acting positions, or, in its second position, enable the car to be moved, but prevent operation of its pedals to drive the car from its own power.

The adjustability of the plate 8 enables the lock to be applied to all cars even though the spacing or construction of the pedal shanks on various cars may differ.

In the modification shown in Fig. 5, the lock is made an integral part of the device. In this construction, 5 indicates the body strip, and 15 indicates the lock, which is secured to the body in place of the transverse projection 6 shown in Fig. 1.

I claim as my invention:

1. A locking device for automobiles having a plurality of foot levers for effecting the control thereof comprising an elongated body adapted to contact with the shanks of a plurality of the control pedals, a transverse extension on said body, a slidable transverse plate on the body, and a locking means for immovably positioning the slidable plate on the body and in spaced relation to the transverse extension by means of which the body may be locked to the shank of one of the pedals.

2. A locking device for the pedals of an automobile consisting of a elongated bar adapted to contact with the shanks of the pedals, an arm fixedly connected with said bar between its ends and extending transversely therefrom, a coacting locking arm slidably mounted on the bar, and a locking device for connecting the fixed arm with the slidable arm when adjusted to holding position at each side of the shank of one of said pedals.

In testimony whereof I hereunto affix my signature.

GEORGE BUFFINGTON KISSINGER.